United States Patent Office 2,936,982
Patented May 17, 1960

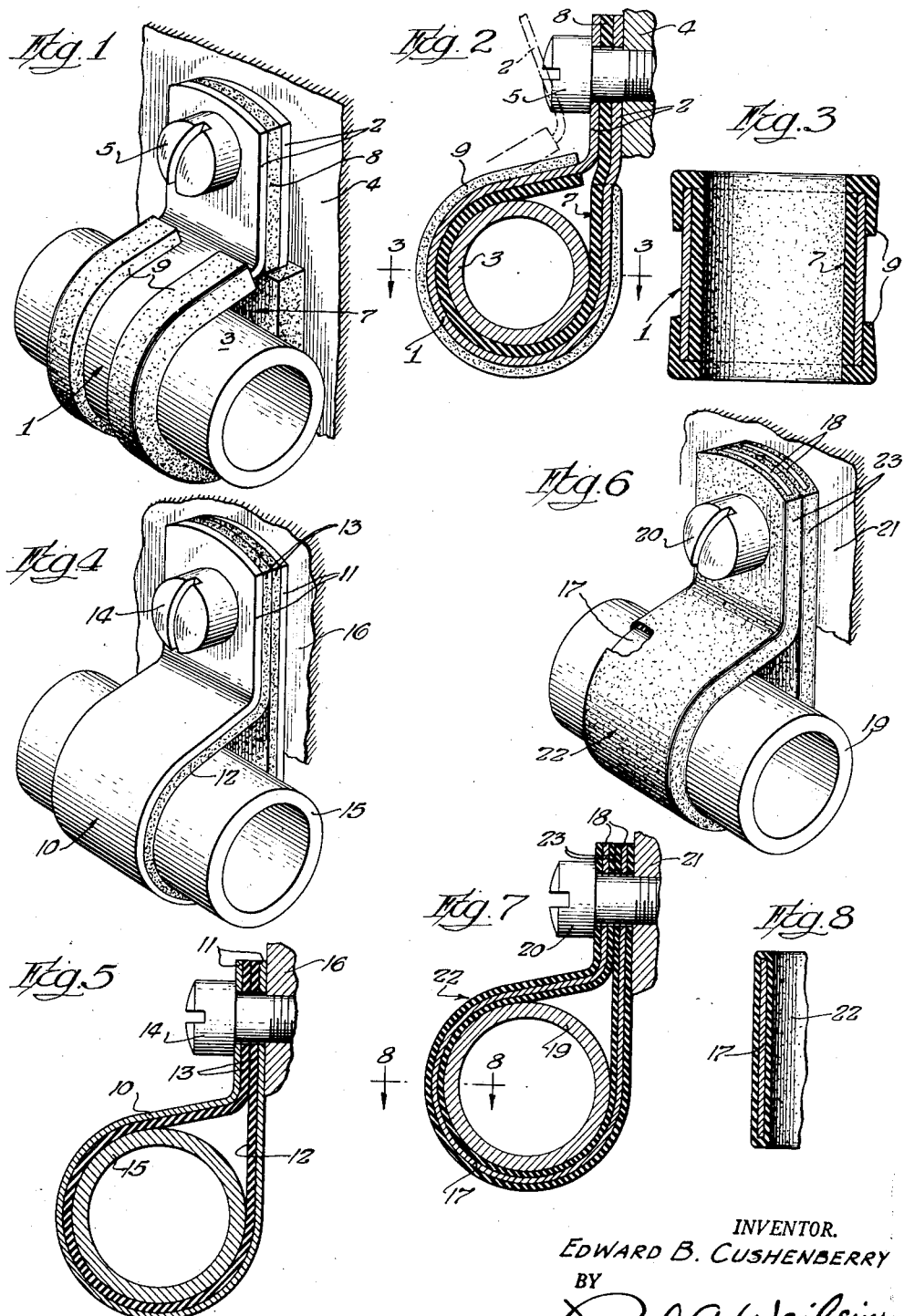

2,936,982
CUSHIONED CONDUIT CLAMP

Edward B. Cushenberry, North Hollywood, Calif., assignor to Thomas Associates, Los Angeles, Calif., a partnership Application April 9, 1956, Serial No. 577,095

1 Claim. (Cl. 248—74)

This invention relates to conduit supporting clamps, particularly the type that are used to support conduit lines on and along structural parts of aircraft.

It is an object of this invention to provide an improved conduit supporting clamp wherein novel cushioning means will prevent failure of the clamp under the vibrations to which such a clamp is subjected when in use, particularly in aircraft.

It is another object of this invention to provide a conduit clamp such as described wherein the apertured ends of the clamp that are fastened to a support, are cushioned so as to dampen vibrations and prevent failure of the clamp.

It is a further object of this invention to provide a conduit clamp such as described in which the conduit-embracing loop portion is cushioned as well as the ends of the clamp.

A further object hereof is the provision of a clamp such as described, wherein a cushioning element for the apertured ends of the clamp is joined to a cushioning element for the loop of the clamp. This assures that these cushioning elements will remain in proper position and makes it unnecessary to separately handle the cushioning elements and the clamp.

It is another object of this invention to provide a clamp wherein the cushioning element for the apertured ends of the clamp is disposed between such ends and has apertures in registration with the apertures in said ends, whereby a fastening may be inserted through such registering apertures to secure the clamp in conduit-supporting position.

It is another object of this invention to provide a clamp of the character described in which an elongated cushioning member has rebent flanges along opposite side edges thereof from one end of the strip to a point spaced inwardly from the other end of the strip. These flanges embrace the edges of the loop portion of the clamp to hold the strip thereon as a cushion for the conduit, as well as to position between the apertured ends of the clamp as a cushion therefor, the end portion of the cushioning member not having the flanges thereon.

It is another object to provide a clamp of the character described wherein the cushioning means for the loop and the ends of the clamp may be in the form of a strip vulcanized or otherwise bonded to the inner surfaces of the loop and one or both ends of the clamp respectively.

An additional object is to provide a conduit supporting clamp such as described in which cushioning means may be embodied to surround the entire clamp except the end edges of the clamp, either as a cushioning material vulcanized or otherwise bonded to the clamp, or as a flat tube of cushioning material fitted over the clamp.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings:

Fig. 1 is a perspective view of a clamp embodying the present invention;

Fig. 2 is a vertical sectional view of the clamp shown in Fig. 1;

Fig. 3 is a cross sectional view taken on the line 3—3 of Fig. 2;

Fig. 4 is a perspective view of a modified form of this invention;

Fig. 5 is a vertical sectional view of the clamp shown in Fig. 4;

Fig. 6 is a perspective view of another modified form of this invention;

Fig. 7 is a vertical sectional view of the clamp shown in Fig. 6; and

Fig. 8 is a cross sectional view on the line 8—8 of Fig. 7.

A preferred form of this invention, as shown in Figs. 1–3, comprises a conduit supporting clamp made of a metal strap formed to provide a loop portion 1 having apertured ends 2 extending outwardly therefrom. The loop portion 1 is adapted to embrace a conduit 3. The apertured ends 2 when brought together to close the loop portion 1 around the conduit 3, are adapted to be secured to a support 4 by the aid of a fastening 5.

It has been the practice to provide cushioning means on the inner surfaces of the loop portions of conduit supporting clamps to dampen vibrations and thus protect the clamp and the conduit. However, in such clamps, the cushioning means has been confined to the loop portions, thereby leaving the end portions of the clamp subjected to vibration. In some instances, these end portions have been broken as a result of such vibration.

The present invention provides novel cushioning means for the apertured ends of a conduit supporting clamp to prevent breaking thereof. Preferably this cushioning means is joined to cushioning means for the loop portion 1 of the clamp and is disposed between the ends 2 of the clamp to dampen vibrations. With this arrangement the entire clamp is protected against failure as a result of vibration.

As shown in Figs. 1–3, one form of cushioning means embodying the present invention comprises an elongated member or strip 7 of resilient rubber, synthetic rubber or similar resilient cushioning material which lines the inner surface of the loop portion 1 of the clamp and has an apertured free end portion 8 disposed between the apertured ends 2 of the clamp.

As a means for holding the cushioning member 7 in place on the clamp, rebent flanges 9 are formed along the side edges of the member 7 except at the side edges of the apertured free end portion 8. These rebent flanges embrace and resiliently grip the side edges of the loop portion 1 and hold the member 7 in place in the loop, with the apertured end portion 8 disposed between the ends 2 of the clamp. The fastening 5 passes through the registering apertures of the ends 2 and end portion 8 respectively, thereby clamping the end 8 of the cushioning member 7 between the ends 2 of the clamp to dampen vibrations to which the ends 2 are subjected. In this arrangement the ends of the rebent flanges 9 are disposed adjacent the junctures of the loop portion 1 with the apertured ends 2 of the clamp.

A modified form of clamp embodying this invention, as shown in Figs. 4 and 5, comprises a loop portion 10 and apertured ends 11 identical with the loop portion and apertured ends shown in Figs. 1–3. In this modified clamp the resilient cushion member or strip 12 having apertured end portions 13 may be vulcanized or otherwise secured to the loop 10 and ends 11. As here shown, the cushioning member 12 is vulcanized to the clamp so that the two end portions 13 thereof will be disposed as cushioning means between ends 11 of the clamp. A fastening 14 may be inserted through the apertures in the ends 11, and 13 to clamp the ends 13 between the ends 11, as well as to secure the clamp and conduit 15 therein upon a support 16. In this form of the clamp, the cushioning member 12 may be somewhat thinner than in the clamp shown in Fig. 1, as both ends 13 of the member 12 are disposed as a cushion between the apertured ends 11 of the clamp. However, the cushioning member 12 may be of the same thickness as shown in Figs. 1–3 or of any desired thickness.

Another modified form of this invention, as shown in Figs. 6, 7 and 8, comprises a clamp having a loop portion 17 and apertured ends 18 as in the previously described clamps. This clamp with a conduit 19 therein, is adapted to be secured by means of a fastening 20 to a support 21 in the same manner as the previously described clamps.

The cushioning means 22 for the modified form of clamp shown in Figs. 6, 7 and 8, surrounds the entire clamp except the transverse edges of the apertured ends 18 of the clamp. Thus, this cushioning means may be provided by vulcanizing to the clamp, rubber, synthetic rubber or a similar cushioning material, so as to cover the inner and outer surfaces of the loop portion 17 and ends 18 respectively, or it may be in the form of a prepared flat tube of cushioning material mounted on the clamp in tight engagement therewith or adhered thereto. In all such cases the cushioning means will appear as shown in Figs. 6, 7 and 8, wherein it is shown as surrounding the entire clamp in intimate contact therewith except the transverse edges of the end portions 18. The end portions 23 of the cushioning means 22 are apertured so that the apertures register with the apertures in the end portions 18 of the clamp. In this form, as well as in the form shown in Figs. 4 and 5, the cushioning means between the ends of the clamp is two parts and will effectively dampen vibrations to which the apertured ends of the clamp are subjected.

I claim:

In a clamp for supporting a conduit upon a structure subject to severe vibration, a metal clamp body portion including a loop to embrace the conduit and a pair of spaced opposed apertured end extensions formed integral with said loop and projecting laterally of the loop for attachment to said structure, the improvement comprising: a lining of compressible resilient rubber-like material for the interior of said loop; and a lateral lining extension of said material disposed between said end extensions and contacting the inner faces of the end extensions and compressed therebetween when the end extensions are secured to said structure; said lining extension cushioning the end extensions and absorbing shocks transmitted to the clamp by said vibration and thereby preventing failure by fracture of the metal clamp body portion near said junctures of the end extensions and loop.

References Cited in the file of this patent

UNITED STATES PATENTS

| | | |
|---|---|---|
| 432,305 | Foley | July 15, 1890 |
| 2,359,209 | Ellinwood | Sept. 26, 1944 |
| 2,396,838 | Ellinwood | Mar. 19, 1946 |
| 2,399,183 | Harrison | Apr. 30, 1946 |
| 2,404,531 | Robertson | July 23, 1946 |
| 2,423,222 | Berry | July 1, 1947 |
| 2,491,290 | Tinnerman | Dec. 13, 1949 |
| 2,709,558 | Young | May 31, 1955 |

FOREIGN PATENTS

| | | |
|---|---|---|
| 990,925 | France | June 13, 1951 |